(12) United States Patent
Frens

(10) Patent No.: US 8,469,375 B2
(45) Date of Patent: Jun. 25, 2013

(54) ADJUSTMENT BOLT FOR ADJUSTING CAMBER ANGLE

(75) Inventor: James Roger Frens, Estes Park, CO (US)

(73) Assignee: Niwot Corporation, Longmont, CO (US)

( * ) Notice: Subject to any disclaimer, the term of this patent is extended or adjusted under 35 U.S.C. 154(b) by 102 days.

(21) Appl. No.: 13/035,344

(22) Filed: Feb. 25, 2011

(65) Prior Publication Data

US 2012/0219379 A1    Aug. 30, 2012

(51) Int. Cl.
*B62D 17/00*    (2006.01)

(52) U.S. Cl.
USPC ............ 280/86.753; 280/86.754; 411/398

(58) Field of Classification Search
USPC ... 280/86.753, 86.751, 86.75, 86.754; 411/398, 411/366.1; 403/408.1; 16/239, 240, 241, 16/242, 243, 244, 245, 246
IPC .................................. F16B 33/00; B62D 17/00
See application file for complete search history.

(56) References Cited

U.S. PATENT DOCUMENTS

| | | | |
|---|---|---|---|
| 4,313,617 A * | 2/1982 | Muramatsu et al. ..... | 280/86.753 |
| 4,616,845 A | 10/1986 | Pettibone | |
| 4,619,465 A | 10/1986 | Johnson | |
| 4,695,073 A | 9/1987 | Pettibone et al. | |
| 4,706,987 A | 11/1987 | Pettibone et al. | |
| 4,863,187 A | 9/1989 | Artz | |
| RE33,179 E | 3/1990 | Pettibone | |
| 4,982,977 A * | 1/1991 | Shimada ................... | 280/86.753 |
| 5,007,658 A | 4/1991 | Blechschmidt | |
| 5,080,388 A | 1/1992 | Berry et al. | |
| 5,104,141 A * | 4/1992 | Grove et al. ............. | 280/86.753 |
| 5,110,151 A | 5/1992 | Blechschmidt et al. | |
| 5,129,669 A * | 7/1992 | Specktor et al. ......... | 280/86.753 |
| 5,163,699 A * | 11/1992 | Specktor ................. | 280/86.753 |
| 5,301,977 A | 4/1994 | Schlosser et al. | |
| 5,622,378 A | 4/1997 | Schlosser et al. | |
| 5,779,260 A * | 7/1998 | Reilly et al. ............. | 280/86.754 |
| 5,836,597 A | 11/1998 | Schlosser et al. | |
| 6,036,205 A | 3/2000 | Schlosser et al. | |
| 6,302,416 B1 * | 10/2001 | Schmack ................. | 280/93.512 |
| 2006/0088398 A1 | 4/2006 | Lund | |

FOREIGN PATENT DOCUMENTS

| | | | |
|---|---|---|---|
| CA | 2047580 | | 8/1992 |
| CA | 2161637 | | 11/1994 |
| DE | 3714689 A1 | * | 11/1988 |
| EP | 0255921 | | 2/1988 |
| JP | 3161088 U | * | 7/2010 |
| KR | 2010070459 A | * | 2/2011 |
| WO | WO 94/25326 | | 11/1994 |

* cited by examiner

*Primary Examiner* — Paul N Dickson
*Assistant Examiner* — Keith Frisby
(74) *Attorney, Agent, or Firm* — Dorsey & Whitney LLP

(57) ABSTRACT

An adjustment bolt for adjusting the camber angle in a vehicle. The adjustment bolt includes a head, a neck, a lobe, and a threaded portion. The head is configured to provide a gripping surface for a tightening tool (e.g., pliers, wrench). The head has a first diameter and a first centerline. The neck extends eccentrically from the bottom surface of the head and the neck has a second diameter and a second centerline. The lobe extends eccentrically outward from a bottom surface of the neck and the lobe has a third diameter and a centerline that is the same as the first centerline. The threaded portion extends eccentrically outward from a bottom surface of the lobe and has a third centerline. The first centerline, the second centerline, and the third centerline are different from one another.

17 Claims, 15 Drawing Sheets

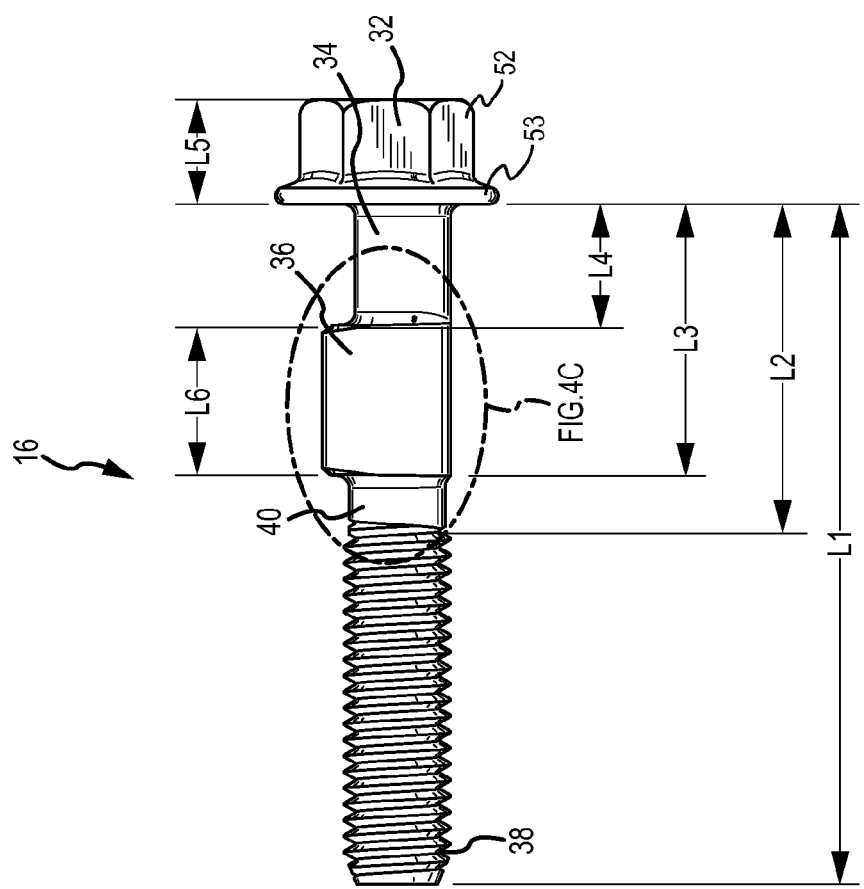

ADJUSTMENT BOLT FOR ADJUSTING CAMBER ANGLE

FIELD

The present disclosure relates generally to an apparatus for adjusting camber in a vehicle, and more specifically, to a fastener apparatus for adjusting camber in a vehicle suspension system.

BACKGROUND

The camber angle, referred to simply as camber in the automotive trade, is the variance in degrees measured between true vertical and that of the measured vertical axis of the wheel as viewed from the front or back. Most vehicles are developed and produced with camber specifications recommended and published by the manufacturer. Camber, in combination with suspension design and other wheel alignment specifications, is developed to best meet a vehicle's handling and tire wear expectations. Most vehicles do not provide for a built in method of adjusting camber. In other words, the wheel assembly may be securely attached to the suspension system, which may make adjusting the camber angle more difficult. In these vehicles, the arrangement may include a generally vertical suspension strut including a knuckle assembly operably connected to a lower portion thereof. The knuckle may then attach to a wheel spindle (which connects to the wheel). Although these vehicles may be made to have a non-adjustable camber angle, to keep a vehicle in specification for optimized handling and tire wear attributes, camber may need to be adjusted from time to time. Bolts, cam shaped washers, other fastener assemblies, and grinding bolt holes into slots have been used to mechanically alter camber on vehicles with these "non-adjustable" suspension systems. However, each suspension system may include differently sized apertures to receive the fasteners, and different sized or shaped bolts may be needed to maximize camber change for each different suspension system. This may require mechanics and/or automobile part stores to stock a number of different bolts to best serve the market.

SUMMARY

The present disclosure relates to an adjustment bolt for adjusting camber in a vehicle. The adjustment bolt may include a head, a neck, a lobe (or cam), and a threaded portion. The head may be configured to provide a gripping surface for a tightening tool (e.g., pliers, wrench). The head has a first diameter and a first centerline. The neck extends eccentrically from the bottom surface of the head and the neck has a second diameter and a second centerline. The lobe extends eccentrically outward from a bottom surface of the neck and the lobe has a third diameter and a centerline that is the same as the first centerline. The threaded portion extends eccentrically outward from a bottom surface of the lobe and has a third centerline. The first centerline, the second centerline, and the third centerline are different from one another.

Other embodiments may include an adjustment assembly for adjusting the camber in a vehicle. The adjustment assembly may include an adjustment washer and an adjustment bolt configured to be inserted into the adjustment washer. The adjustment washer includes a prong extending away at a first angle from a body of the washer, and a tang extending in the opposite direction from the prong, but perpendicularly to the body of the adjustment washer. The tang is configured to be inserted into a receiving aperture on a U-bracket or flange operably connected to a vehicle suspension system. The adjustment bolt includes a head, a neck, a cam, and a threaded portion. The head forms a first end of the adjustment bolt. The neck extends eccentrically from a bottom surface of the head and is substantially cylindrically shaped and has a neck centerline. The cam extends eccentrically from a right bottom surface of the neck, opposite of the head. The cam is substantially cylindrically shaped and has a cam centerline. The threaded portion extends from a right bottom surface of the cam, such that along a right side surface of the adjustment bolt, the neck, the cam and a major diameter of the threaded portion are effectively flush. Additionally, the threaded portion has a thread centerline.

Still other embodiments include a method for adjusting camber in a vehicle. The method may include sliding an adjustment washer onto an adjustment bolt. The adjustment washer includes a prong extending away at a first angle from a body of the washer, and a tang extending in an opposite direction perpendicularly to the body of the washer. The tang is configured to be inserted into a receiving aperture on a flange operably connected to a strut of a vehicle suspension system. The adjustment bolt includes a head, a neck, a lobe, and a threaded portion. The head forms a first end of the adjustment bolt. The neck extends eccentrically from a bottom surface of the head, it is substantially cylindrically shaped with a neck centerline. The lobe extends eccentrically from a right bottom surface of the neck, opposite of the head. The lobe is substantially cylindrically shaped and has a lobe centerline. The threaded portion extends eccentrically from a right bottom surface of the lobe such that along a right side surface of the adjustment bolt, the neck, the lobe and a major diameter of the threaded portion are effectively flush. Additionally, the threaded portion has a thread centerline which differs from the lobe and neck centerlines. After the adjustment washer has been inserted onto the adjustment bolt, the threaded portion of the adjustment bolt is inserted into a receiving aperture on a flange operably connected to a strut of a vehicle. Then, the tang of the adjustment washer is inserted into the receiving aperture, such that a bottom surface of the washer may be substantially flush with a first outer surface of the flange. A nut is applied to the threads of the bolt and it is loosely tightened. After the nut and adjustment bolt have been loosely tightened the tang is oriented inward or outward horizontally depending on the kind of camber change required. The adjustment bolt is then rotated within the receiving aperture to obtain a desired camber angle.

These and other aspects and advantages of embodiments of the disclosure will become apparent from the detailed description and drawings that follow.

BRIEF DESCRIPTION OF THE DRAWINGS

FIG. 4B is a rear elevation view of the adjustment bolt illustrated in FIG. 3.

DETAILED DESCRIPTION

The present invention relates to an adjustment bolt for adjusting the camber angle of a wheel for a vehicle. The adjustment bolt may be incorporated as part of an adjustment assembly that may be used to operably connect a knuckle supporting a wheel hub to a suspension strut. The adjustment bolt includes a head, a neck, a lobe or cam, and a threaded portion. The head and lobe share a same centerline, whereas the threaded portion and the neck have different centerlines from each other and from the head and lobe. In other words, the lobe and head have a first centerline, the neck has a second centerline and the threaded portion has a third centerline. Thus, the adjustment bolt has three separate centerlines or symmetry axes. As the adjustable bolt has three different centerlines, the major diameter of the threaded portion may stay within the outer diameter of the lobe. This allows for a single size adjustable bolt to be used for multiple suspension systems with varying apertures. This may reduce the number of stock keeping units (SKUs) required to be stocked in an automobile parts store, mechanic or the like. Additionally, the multiple centerlines may also allow for a greater camber angle change, as the lobe may be created larger, having a larger offset with respect to the neck, this additional lobe size and offset with respect to the neck may allow for approximately a 20% increase in adjustment angle.

Additionally, along a first plane a major diameter of the thread portion (i.e., the diameter measured from a maximum height of each thread) is configured to be flush or effectively flush with the neck diameter and a lobe diameter. In this embodiment, the plane hits the top surface of the threads, the neck and the lob in a straight line that is parallel to a horizontal axis of the adjustment bolt. However, on a second plane the lobe diameter is not flush either with the neck or a major diameter of the threads. Thus, as viewed from a rear elevation view one side of the adjustment bolt aligns on a single plane, and on a second side the various portions of the adjustment bolt align on separate planes. As the major diameter of the threads is flush with one plane of the lobe and all the planes of the neck, the adjustment bolt may be able to be inserted into a number of different receiving apertures. This is beneficial as fewer bolt diameter embodiments (e.g., SKUs) may need to be stored by mechanics, automobile part stores, and the like, in order to accommodate most vehicle suspension systems.

Figure 1:
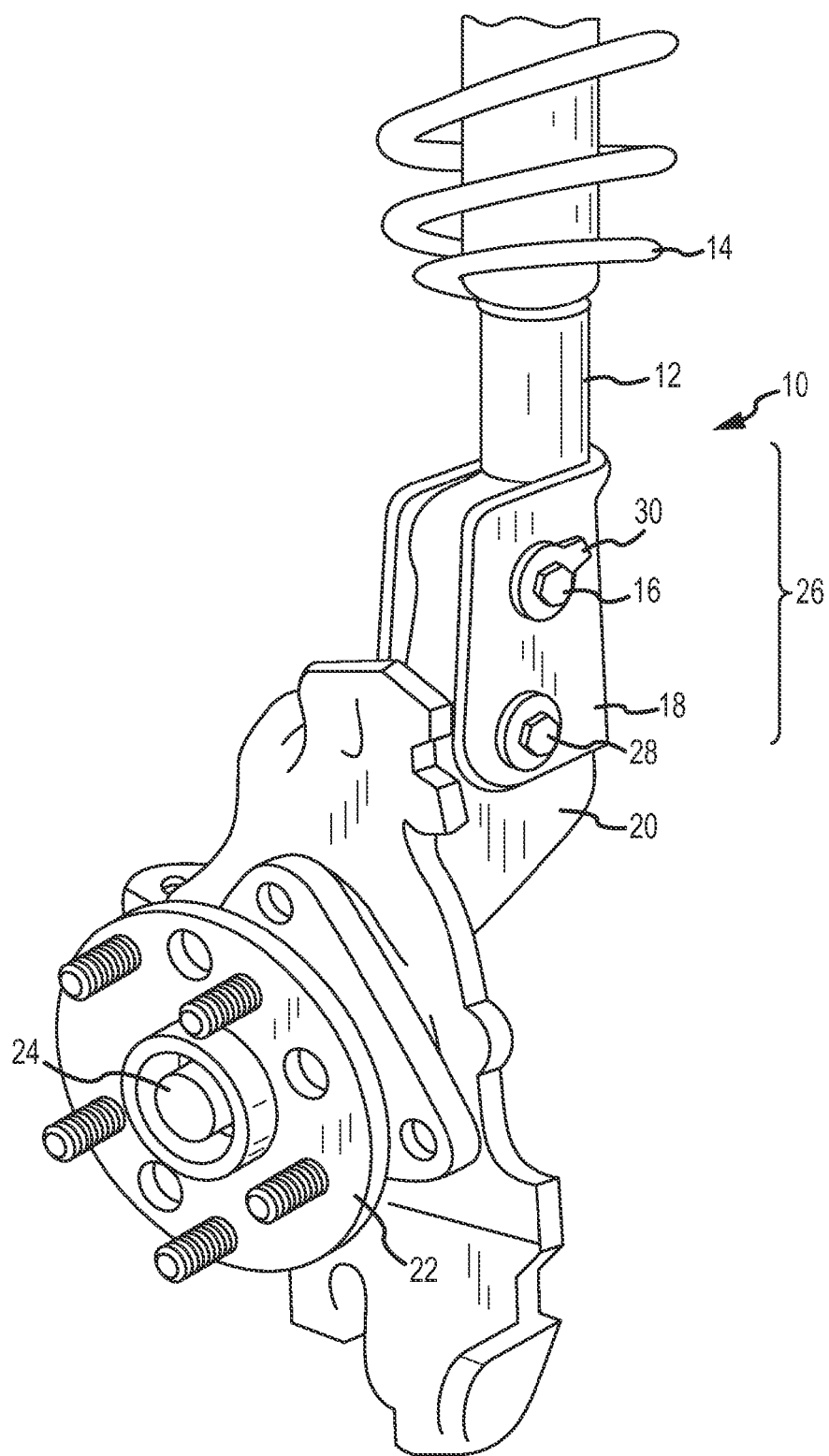
FIG. 1 is an isometric view of a portion of a vehicle suspension system including a suspension strut operably connected, via an adjustment assembly, to a knuckle assembly. The knuckle assembly is connected to a wheel hub.

FIG. 1 is an isometric view of a vehicle suspension system 10 including a suspension strut 12 operably connected via an adjustment assembly 26 to a knuckle assembly 20. The knuckle 20 is operably connected to a wheel hub 22. The suspension system 10 may be connected between a vehicle and a wheel (not shown) of the vehicle. The suspension system 10 may be used to steer the vehicle, as well as provide comfort for passengers within the vehicle by reducing shock from motion of the vehicle from entering into the vehicle. The suspension system 10 illustrated in FIG. 1 is a for a single wheel of a vehicle and the other half of the entire vehicle suspension is not shown. However, the other half of the suspension system may be essentially the same as the suspension system 10 illustrated in FIG. 1. The suspension system 10 includes a strut 12 and a spring 14 which are operably connected to the knuckle 20 via an adjustment assembly 26. The knuckle 20 may then be operably connected to a wheel hub 22 via a spindle 24.

The strut 12 and the spring 14 support the vehicle body, while providing damping and control for the vehicle. The strut 12 may consist of a generally vertical cylindrical body and the spring 14 wraps around the outer surface of the strut 12. The adjustment assembly 26 operably connects to the strut 12 via a U-bracket 18 or flanges extending from the strut 12. For example, as shown in FIG. 1, the U-bracket 18 is inserted around a lower body of the strut 12, such that the strut 12 is surrounded on three sides. The U-bracket 18 receives an upper portion of the knuckle 20 and then an adjustment bolt 16 and a fastener 28 secure the knuckle 20 and U-bracket 18 to the strut 12. In some embodiments, the U-bracket 18 may be replaced by flanges extending from a lower portion of the strut 12 (see, e.g., FIG. 2). In these embodiments, the knuckle 20 may be inserted in between the two flanges, which substantially act as a U-bracket by utilizing the body of the strut 12 as the back portion. A wheel hub 22 may then connect to a spindle 24 extending from the knuckle 20. The wheel hub 22 operably connects to a wheel (not shown) for the vehicle.

The adjustment assembly 26 may be used to vary a camber angle of the wheel hub 22 (and wheel) when it is connected to the knuckle 20. Camber is the variance in degrees measured between true vertical and that of the measured vertical axis of the wheel assembly (when viewed from the front or the rear). For example, if the top of a wheel is farther away from the vehicle than the bottom of the wheel, the camber angle is positive. On the other hand, if the top of the wheel is closer to the vehicle than a bottom of the wheel, the camber angle is negative. The camber angle may affect the handling qualities of a vehicle. For example, a negative camber angle may improve the grip of the tires while the vehicle is cornering. This is because the negative camber angle allows forces between the road and the vehicle to be transmitted across a vertical plane rather than a shear force across the tire. A positive camber angle may help to increase a steering ease of the vehicle. Additionally, an excessive (e.g., too large) camber angle in any direction may increase tire wear, as well as impair handling. The adjustment assembly 26 alters the position of the knuckle 20 within the U-bracket 18 and with respect to the strut 12, so as to alter the camber angle.

Figure 2:
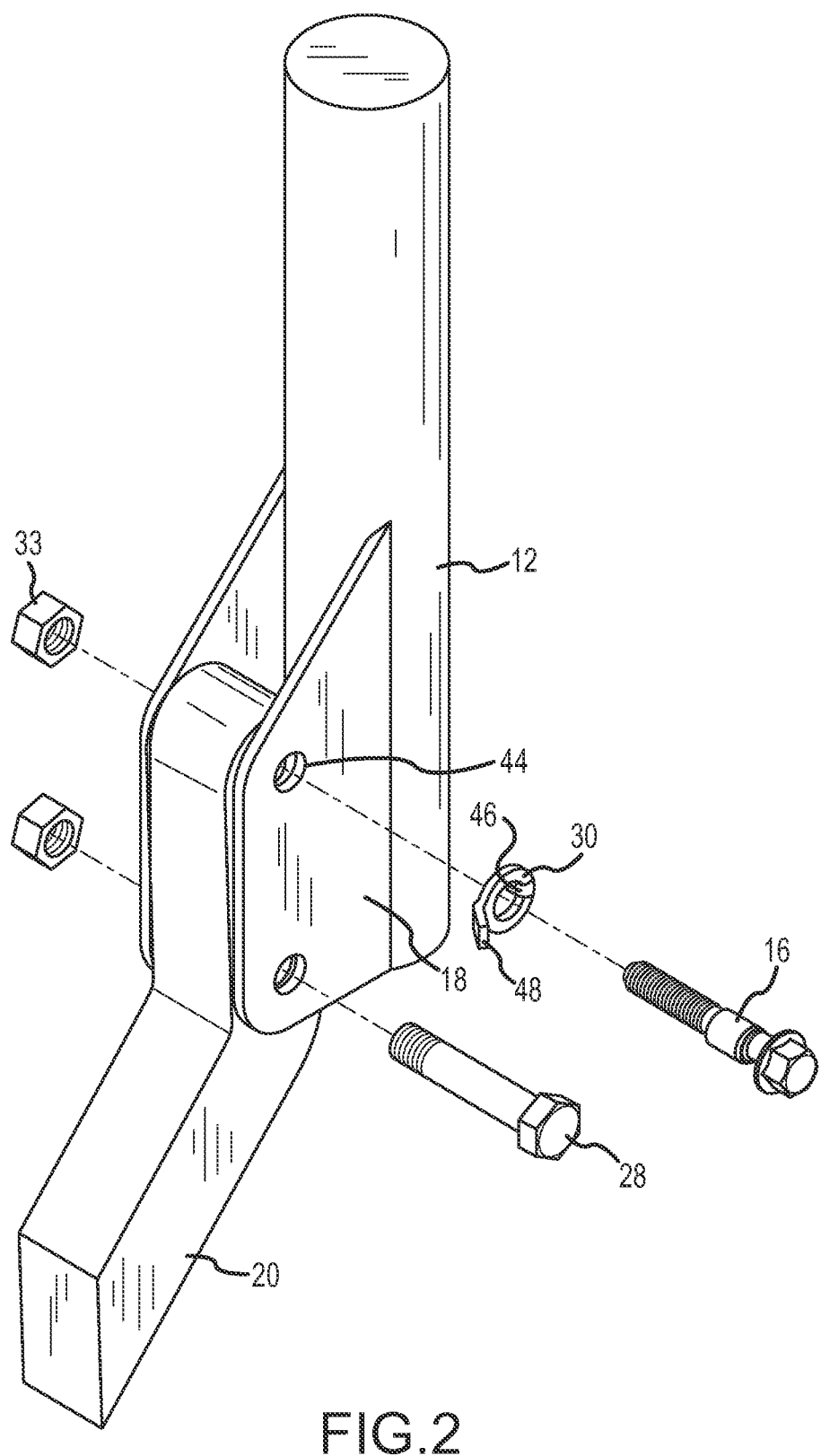
FIG. 2 is an exploded isometric view of the suspension strut operably connected to a portion of the knuckle via the adjustment assembly.

FIG. 2 is an exploded view of the adjustment assembly 26 operably connecting the strut 12 to the knuckle 20. The adjustment assembly 26 includes an adjustment bolt 16, a fastener 28 or bolt, an adjustment washer 30, and a locking nut 33. The fastener 28 operably connects one portion of the knuckle 20 to the U-bracket 18. The fastener 28 may be a bolt, screw or any other fastening device that may securely fasten the knuckle 20 to the U-bracket 18. The fastener 28 may substantially prevent the knuckle 20 from rotating within the U-bracket 18. The fastener 28 may be operably connected to the knuckle 20 and the U-bracket 18 with a washer, nut and the like.

The adjustment washer 30 may include a prong 48 and a tang 46. The adjustment washer 30 is used in combination with the adjustment bolt 16 to adjust the camber angle for the vehicle. The tang 46 extends perpendicularly from a bottom surface of the adjustment washer 30. The tang 46 may be inserted around a portion of the adjustment bolt 16 and placed within a receiving aperture 44 in the U-bracket 18. The tang 46 helps secure the adjustment bolt 16 in a proper orientation within the receiving aperture 44. Extending on an opposite side of the adjustment washer 30 is a prong 48. The prong 48 may extend away from a main body of the washer 30 at a slight angle, so that when the washer 30 is placed against the outer surface of the U-bracket 18, the prong 48 extends away from an outer surface of the U-bracket 18. The prong 48 allows a user to fit the tang 46 within the receiving aperture 44, in order to best position the adjustment bolt 16 and washer 30 within the receiving aperture 44.

Figure 3:
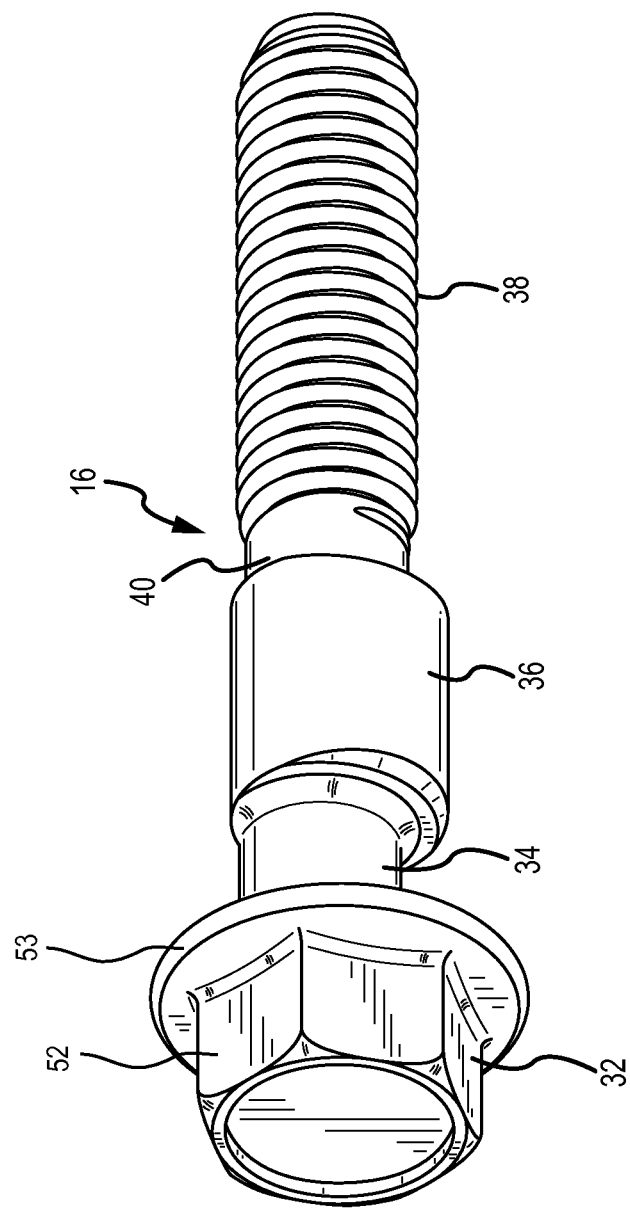
FIG. 3 is an isometric view of an adjustment bolt forming a part of the adjustment assembly illustrated in FIG. 2.
Figure 4A:
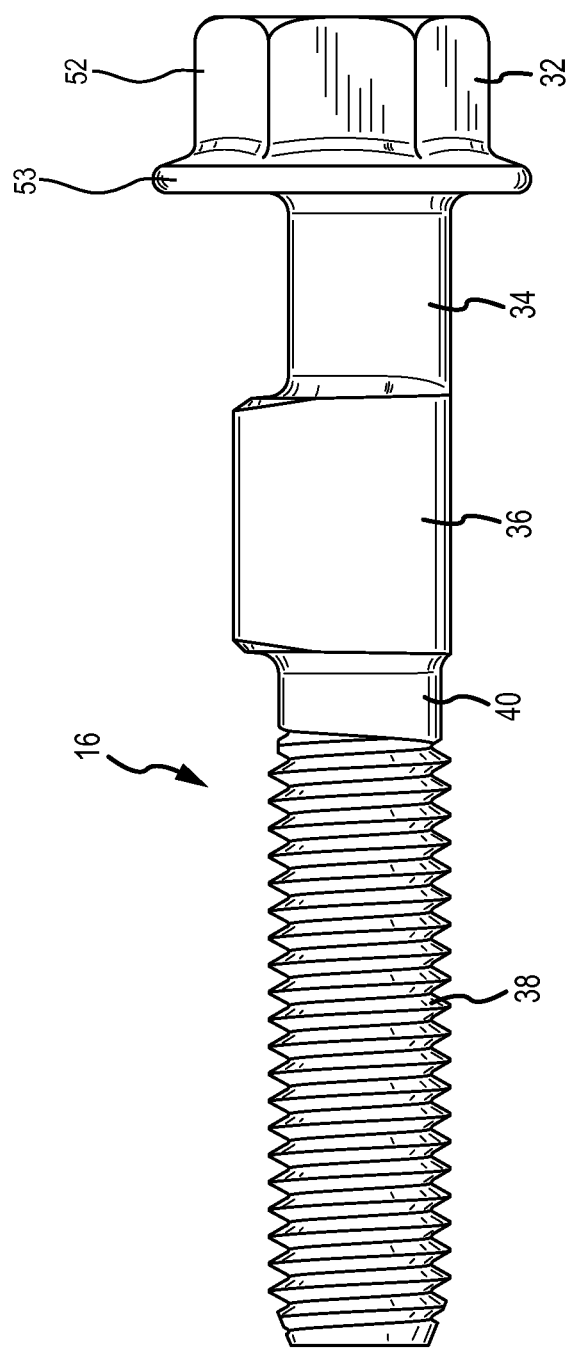
FIG. 4A is a front elevation view of the adjustment bolt illustrated in FIG. 3.
Figure 4C:
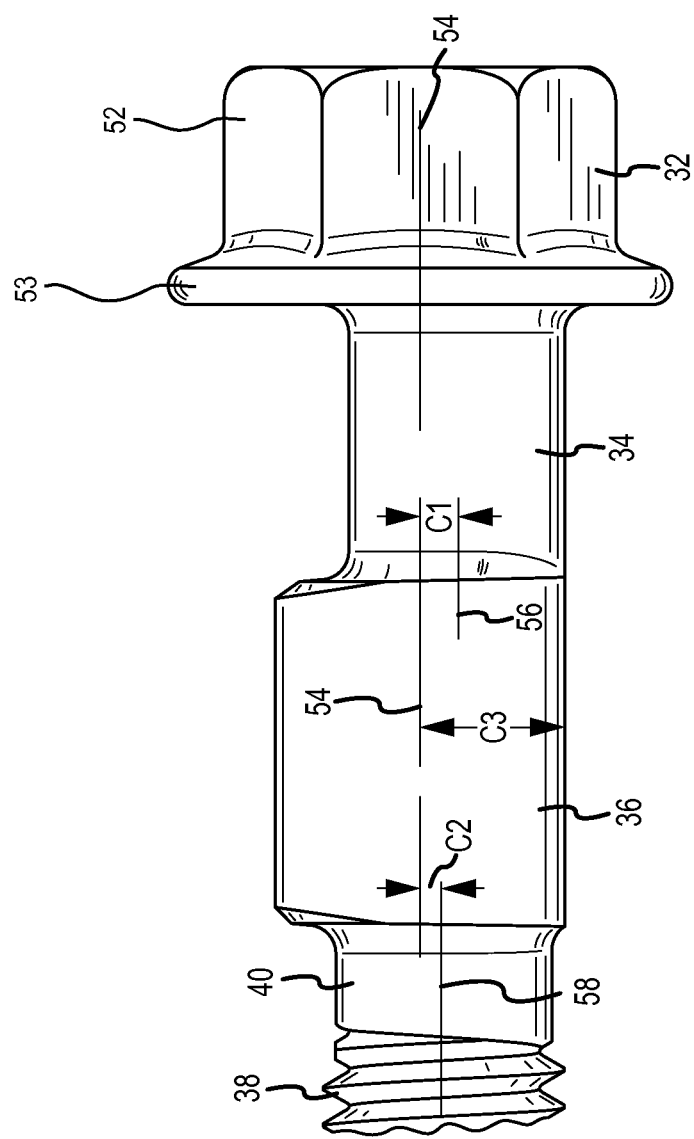
FIG. 4C is an enlarged rear elevation view of a head, neck and lobe of the adjustment bolt illustrated in FIG. 4B.

FIG. 3 is an isometric view of the adjustment bolt 16, FIG. 4A is a front elevation view of the adjustment bolt, FIG. 4B is a rear elevation view of the adjustment bolt 16, and FIG. 4C is a an enlarged rear view of a portion of the adjustment bolt 16 illustrated in FIG. 4B. The adjustment bolt 16 includes a head 32, a neck 34, a lobe 36 or cam, a threaded portion 38, and a transition portion 40. The adjustment bolt 16 is configured to be inserted into the receiving apertures 44 on the U-bracket 18 and held in place via the adjustment washer 30, and a locking nut 33. The adjustment bolt 16 extends through the receiving apertures 44 and an adjustment aperture 50 (see, e.g., FIGS. 10A and 10B) on the knuckle 20. A part of each the neck 34, the lobe 36 and the threaded portion 38 are retained within the adjustment aperture 50, and then the threaded portion 38 extends out past the second receiving aperture 44 and the nut 33 is secured around the exposed threaded portion 38. The adjustment bolt 16 may be steel, steel alloy (e.g., 4140 steel, 5140 steel), or other materials with similar properties.

The head 32 is configured to provide a gripping surface for a wrench, pliers, or other similar tightening or adjusting tools to allow the adjustment bolt 16 to be rotated within the adjustment aperture 50 and receiving apertures 44. Thus, the head 32 may include a faceted or hexagonal shaped body 52. The body 52 then expands outwards to form a plate 53. The plate 53 is configured to rest along an outer surface of the adjustment washer 30 when the adjustment bolt 16 is operably connected to the strut 12. The head 32 has a length L5 measured from a bottom surface of the plate 53 to the front surface of the body 52. The length L5 is essentially the thickness of the head 32 and may be varied to accommodate differently sized adjustment tools, as well as differently sized receiving apertures 44.

After the head 32, the adjustment bolt 16 transitions into the neck 34. The neck 34 extends eccentrically from a bottom surface of the plate 53 and has a smaller diameter then the plate 53. The neck 34 includes a length L4 that in some embodiments may range between approximately 11.2 mm (0.44 inches) and 12.6 mm (0.49 inches). However, it should be noted that the neck 34 length L4 may be any dimension, as long as the lobe 36 may be positioned within the receiving aperture 44 and still be within the adjustment aperture 50. Additionally, the neck 34 has a neck centerline 56. The neck centerline 56 is located at a different position from the head centerline 54, which is located at a distance C3 from an outer surface of the lobe 36. The neck centerline 56 is located at a distance C1 below the head centerline 54. The distance C1 between the neck centerline 56 and the head centerline 54 may range between approximately 1.02 mm (0.04 inches) to approximately 1.55 mm (0.061 inches). In this manner, the center or symmetry axes of the head 32 and the neck 34 are aligned different from one another, such that the neck 34 may be eccentrically aligned with respect to the head 32.

The lobe 36 extends eccentrically outwards from a bottom right surface of the neck 34. The lobe 36 is eccentrically aligned with the neck 34, such that along a right surface the head 32, the neck 34 and the lobe 36 intersect at a same plane. The lobe 36 has a larger overall diameter than the neck 34, the transition region 40 and the threaded portion 38. The lobe 36 has a length L6, and the length L6 may be larger than the length L4 of the neck 34. For example, in some embodiments the length L6 may be approximately 0.55 inches and the length L4 may be approximately 0.45 inches. However, in other embodiments, both the length L6 and the length L4 may be approximately 0.50 inches; and furthermore, the lobe length L6 may be shorter than the neck 34 length L4.

The combination of the lobe 36 and the neck 34 has a length L3, measured from an end of the lobe 36 to the bottom surface of the plate 53. In some embodiments, the length L3 may be approximately 1 inch. However, this length L3 may be any dimension as long as the length L3 is approximately less than a length of the adjustment aperture 50 (e.g., a thickness of the knuckle 20) plus the thickness of the receiving apertures 44. This may help to ensure that the lobe 36 may not become engaged with the second receiving aperture 44 (on the opposite side of the U-bracket 18), which could prevent the adjustment bolt 16 from adjusting the camber. The lobe 36 and the head 32 have the largest diameters of the adjustment bolt 16. The lobe 36 has a lobe centerline or axis, and this centerline 54 is equal to the head 32 centerline 54. In other words, the lobe 36 and the head 32 are positioned, with respect to one another, such that the same bisecting line may intersect halfway between each the head 32 and the lobe 36. The lobe 36 then decreases in diameter to form the transition region 40 which then expands to form the threaded portion 38. The transition region 40 extends from a right bottom surface of the lobe 36, such that the transition region 40 is eccentrically aligned with the lobe 36.

The lobe 36, the neck 34 and the transition region 40 have a length L2, measured from the beginning of the threads forming the threaded portion 38 to the bottom surface of the plate 53. The length L2 may be designed such that the adjustment bolt 16 may extend past the U-bracket 18 far enough to allow the locking nut 33 to be secured to the adjustment bolt 16. Finally, the adjustment bolt 16 has a length L1 as measured from the bottom surface of the adjustment bolt 16 (i.e., the end of the threaded portion 38) to the bottom surface of the plate 53. This length L1 may be altered to accommodate a different size strut 12, U-bracket 18, and/or knuckle 20. The length L1 may determine the percentage or portion of the adjustment bolt 16 that extends outwards past the second receiving aperture 44 within the U-bracket 18.

Figure 5A:
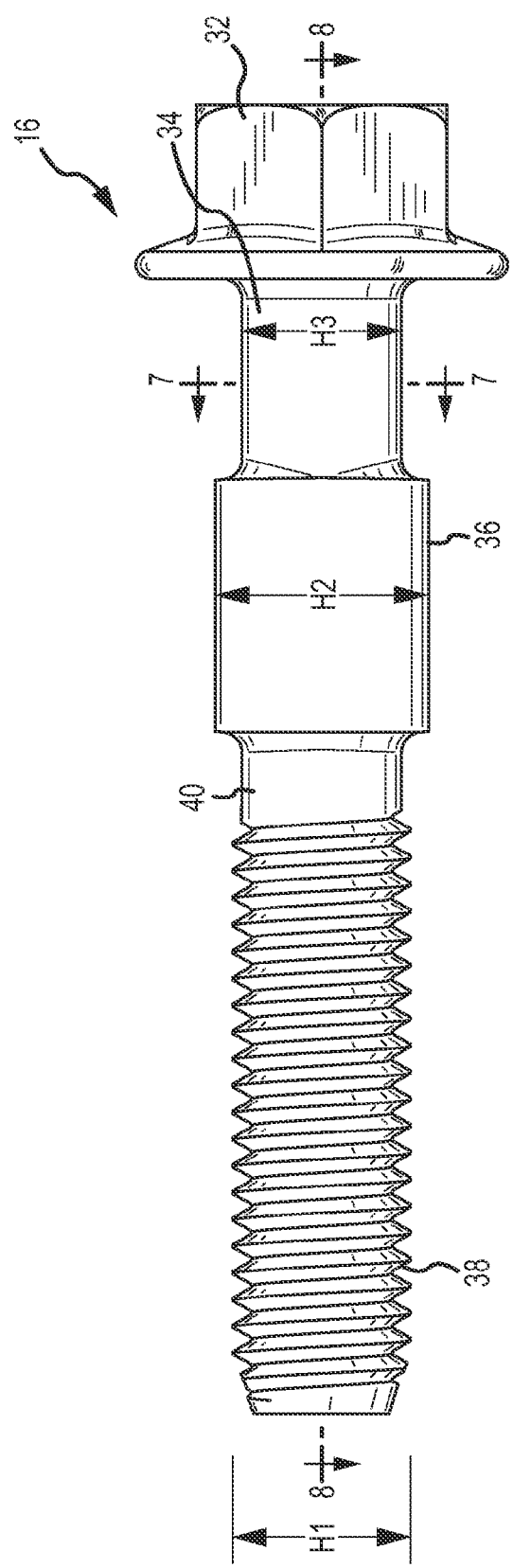
FIG. 5A is a right side elevation view of the adjustment bolt illustrated in FIG. 3.
Figure 5B:
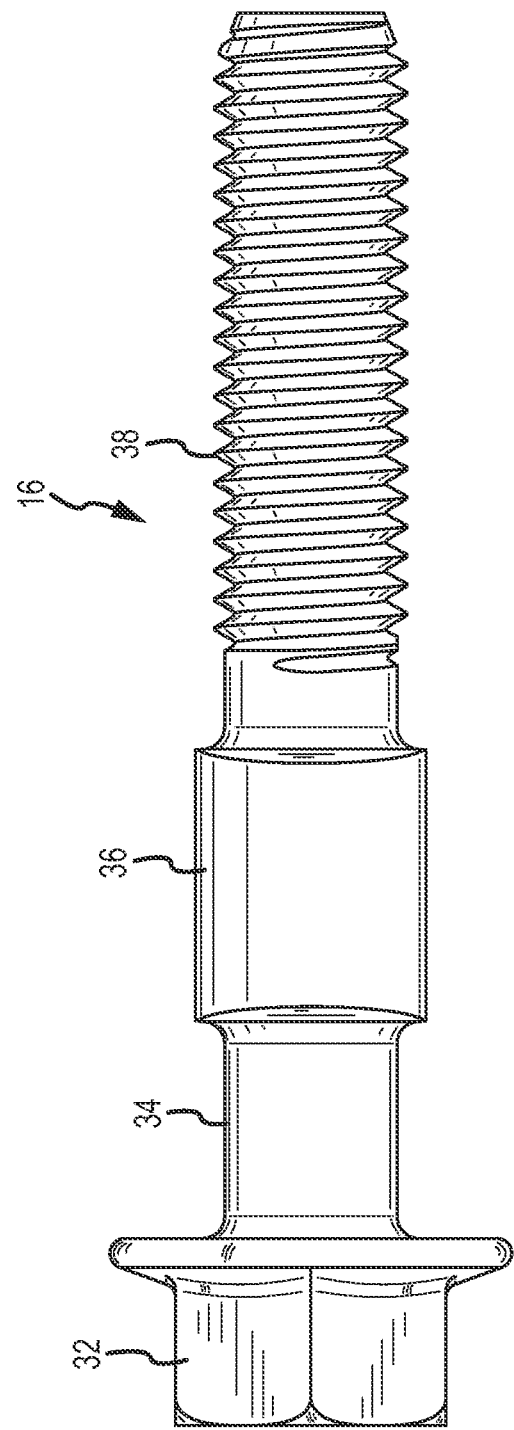
FIG. 5B is a left side elevation view of the adjustment bolt illustrated in FIG. 3.

FIG. 5A is a right elevation view of the adjustment bolt 16 and FIG. 5B is a left elevation view of the adjustment bolt 16. The neck has a diameter H3, the lobe has a diameter H2, and the threaded portion 38 has a diameter H1. As can be seen in FIG. 5A, each diameter H1, H2 and H3 may be different. For example, in one embodiment, H1 may be approximately 0.30 inches, H2 may be approximately 0.470 inches, and H3 may be approximately 0.351 inches. However, in other embodiments, the diameters H1, H2, H3 may have different dimensions, as long as H2 remains the largest, H1 remains the second largest and H3 is the smallest, comparatively. It should be noted that the height H3 of the neck 34 does not have to be smaller than H1 the threaded portion 38; however, in most embodiments it typically may be smaller. As long as the neck 34 is as strong or stronger than the threaded portion 38, the diameter of the neck 34 H3 may be any size as compared with the diameter of the threaded portion H1.

Referring to FIGS. 4C and 5A, the varying heights or diameters H1, H2, H3 of the neck 34, the lobe 36 and the threaded portion 38, as well as the eccentric alignment of each the head 32, the neck 34, the lobe 36 and the threaded portion 38, contribute to the varying centerlines 54, 56, 58 for each the neck 34, the lobe 36 and the threaded portion 38. The head 32 and the lobe 36 have the same centerline 54, the neck 34 has neck centerline 56 and the threaded portion 38 (and transition region 40) has a thread centerline 58. The adjustment bolt 16 thus has three centerlines 54, 56, 58, and each centerline is different. For example, the head 32 and lobe 36 centerline 54 is spaced apart from the neck centerline 56 by a distance C1. This distance C1 may range between approximately 1 mm (0.039 inches) to approximately 1.55 mm (0.061 inches) and may be determined by the desired range of camber adjustment, and/or strength of the adjustment bolt 16 relative to the original bolt. Additionally, the head and lobe centerline 54 is spaced apart from the thread centerline 58 by a distance C2. This distance C2 is less than C1, such that the diameter H1 of the threaded portion 38 is flush to the neck 34.

The three different centerlines 54, 56, 58 allow the adjustment bolt 16 to have an increased range of movement, as compared with other bolts. Prior art bolts used for adjusting the camber angle were designed so that the threaded area and the neck area had the same axis or centerline. Thus, there may have been only two centerlines for the bolt. On the other hand, the adjustment bolt 16 has three separate centerlines 54, 56, 58. These centerlines increase the range of movement that the adjustment bolt 16 may provide to the knuckle 20 within the U-bracket 18. This is because the movement that the adjustment bolt 16 provides to the knuckle 20 may be a function of an offset between the neck 34 and lobe 36 centerlines 54, 56, as well as the "slop" in the receiving apertures 44 of the U-bracket 18 and/or the adjustment aperture 50 in the knuckle 20. The ability of the adjustment bolt 16 to fit a large C1 centerline offset distance into a given receiving aperture 44 and/or adjustment aperture 50, allows the adjustment bolt 16 to provide a greater camber range for a given suspension system.

Figure 6:
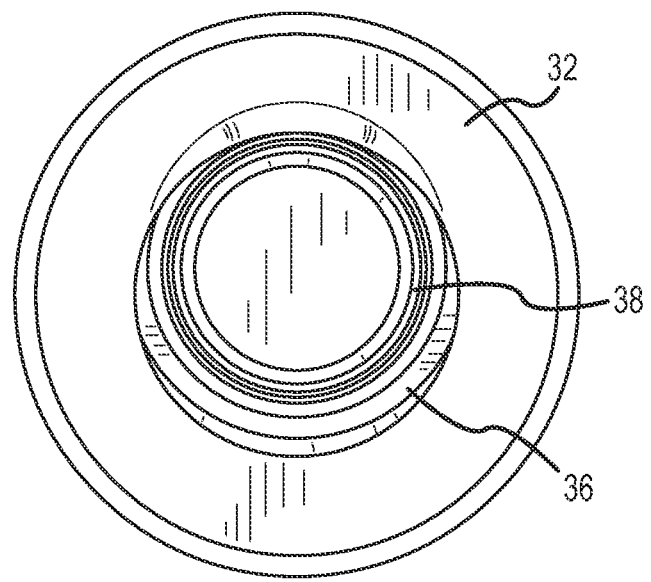
FIG. 6 is a bottom plan view of the adjustment bolt illustrated in FIG. 3.
Figure 7:
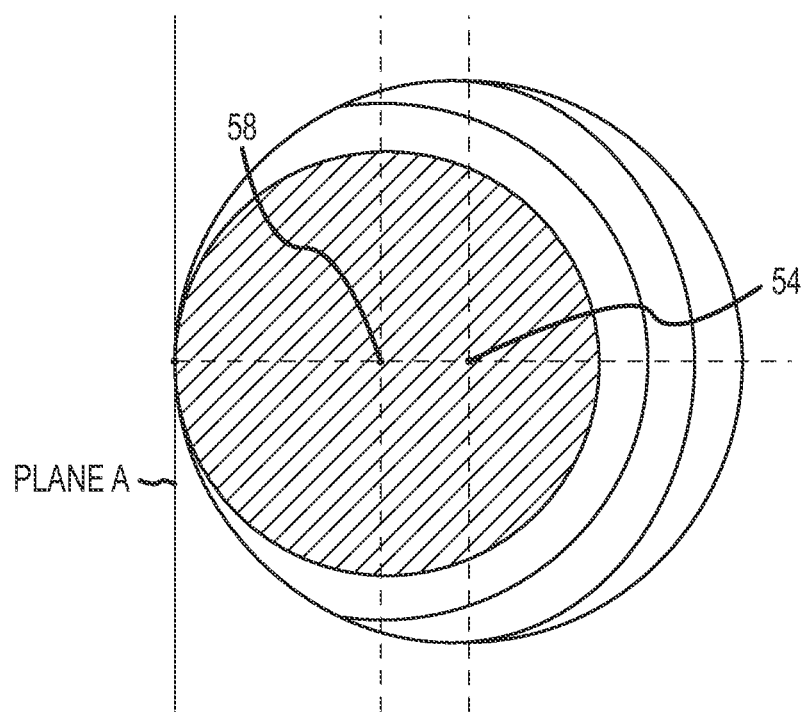
FIG. 7 is a cross-section view of the adjustment bolt illustrated in FIG. 3, viewed along line 7-7 in FIG. 5A.
Figure 8:
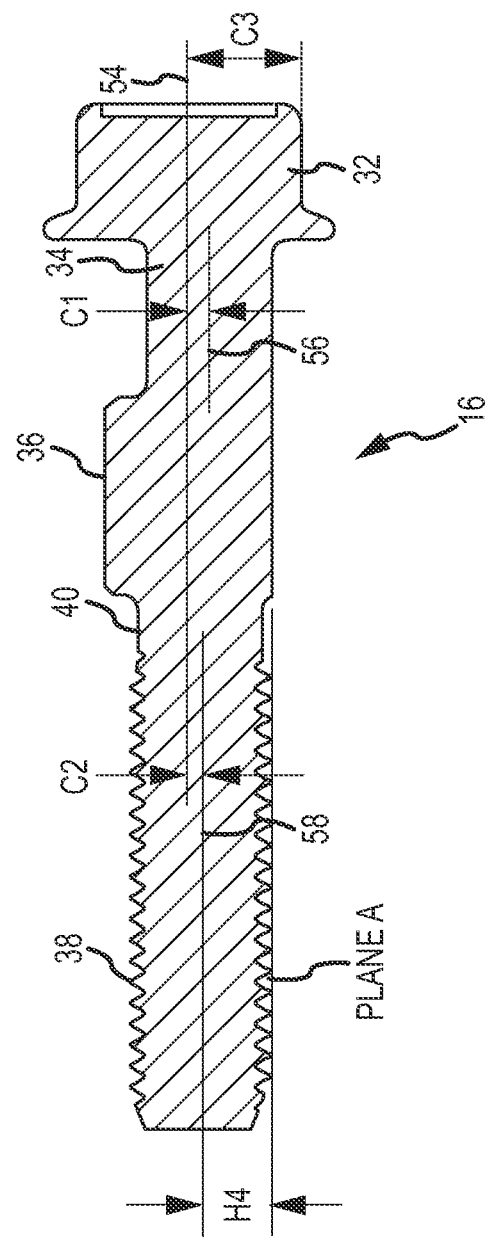
FIG. 8 is a cross-section view of the adjustment bolt illustrated in FIG. 3, viewed along line 8-8 in FIG. 5A.

FIG. 6 is a bottom plan view of the adjustment bolt 16, FIG. 7 is a cross-section view of the adjustment bolt 16 viewed along line 7-7 in FIG. 5A, and FIG. 8 is a cross-section view of the adjustment bolt 16 viewed along line 8-8 in FIG. 5A. The threaded portion 38, the lobe 36, the transition portion 40 and the neck 34 align on one side of the adjustment bolt 16. In one embodiment, this may be a right side of the adjustment bolt 16. As shown in FIGS. 7 and 8, the threaded portion 38, the transition portion 40, the lobe 36, and the neck 34 all align on Plane A. The threaded portion 38 aligns on a major diameter of the threads with the outer diameter of the lobe 36 and neck 34, in other words, the maximum diameter of the threaded portion 38 intersects Plane A. At least a single point on the outer diameter of each the lobe 36, the neck 34 and the threaded portion 34 intersects Plane A at the same location. As best seen in FIG. 7, the threaded portion 38, the transition portion 40, the lobe 36 and the neck 34 are effectively flush with Plane A, and thus intersect Plane A at the same point.

As the neck 34, the lobe 36, the transition portion 40, and a major diameter of the threaded portion 38 are effectively flush with one another, the adjustment bolt 16 may be used in smaller receiving apertures 44 than bolts used in the past to adjust the camber angle. As the adjustment bolt 16 may be used in smaller receiving apertures 44, the adjustment range for the camber angle may be increased due to less "slop" within the receiving apertures 44 and/or the adjustment aperture 50, and the number of parts or SKUs may be reduced. This is because the adjustment bolt 16 may fit more receiving apertures 44 and/or adjustment apertures 50, for different vehicles and suspension systems than bolts that may have been used in the past. Reducing the number of SKUs may allow an automobile parts store or mechanic to save money by having a reduced inventory. Additionally, the degree of camber angle adjustment may be increased to 2.16 degrees in either the positive or negative direction. This angle adjustment is increased over prior art bolts by about 0.5 degrees. This additional angle adjustment may make a significant difference in certain vehicles with "non-adjustable" suspensions systems, as it provides more adjustment room to better set the camber angle.

Figure 9:
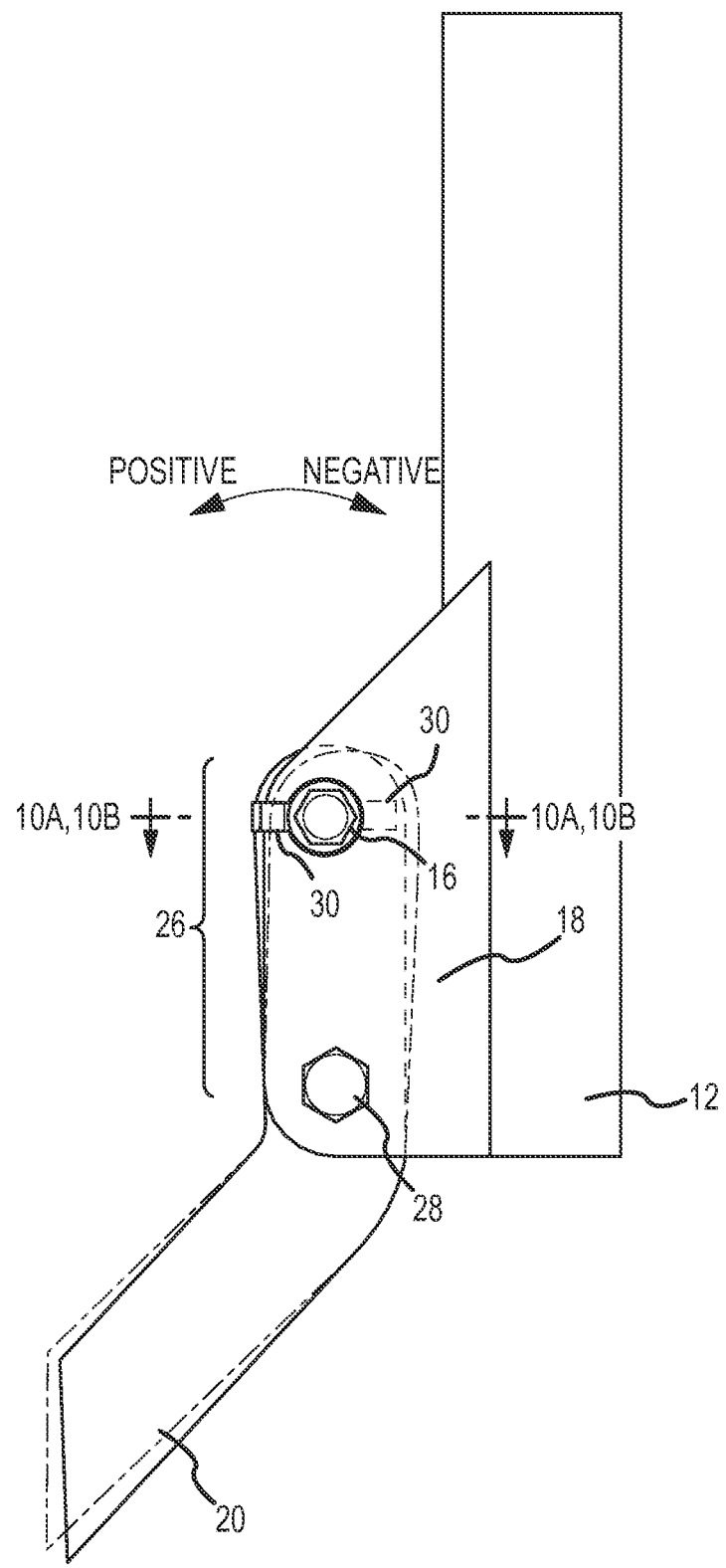
FIG. 9 is a side elevation view of the suspension strut connected to the knuckle via the adjustment assembly, illustrating the knuckle in a positive camber angle achieved via the adjustment assembly and in phantom the knuckle in a negative camber angle.

FIG. 9 is a side elevation view of the suspension strut 12 connected to the knuckle 20 via the adjustment assembly 26 and illustrating the knuckle 20 in a positive camber angle position achieved via the adjustment assembly 26 and in phantom illustrating the knuckle 20 in a negative camber angle position. The adjustment bolt 16 may be used to vary the camber angle of a wheel operably connected to the knuckle 20. The position of the tang 46 within the receiving aperture 44, as well as the position of the lobe 36 within the adjustment aperture 50 determines the camber angle of the knuckle 20. For example, the tang 46 may determine whether the adjustment to the camber is in the positive or negative direction, and the position of the lobe 36 within the adjustment aperture 50 may determine the degree of angle change for the camber. Thus, the adjustment assembly 26 may be positioned such that the knuckle 20 may have a positive camber angle, a negative camber angle, or a neutral camber angle, all with respect to the vehicle (not shown).

Figure 10A:
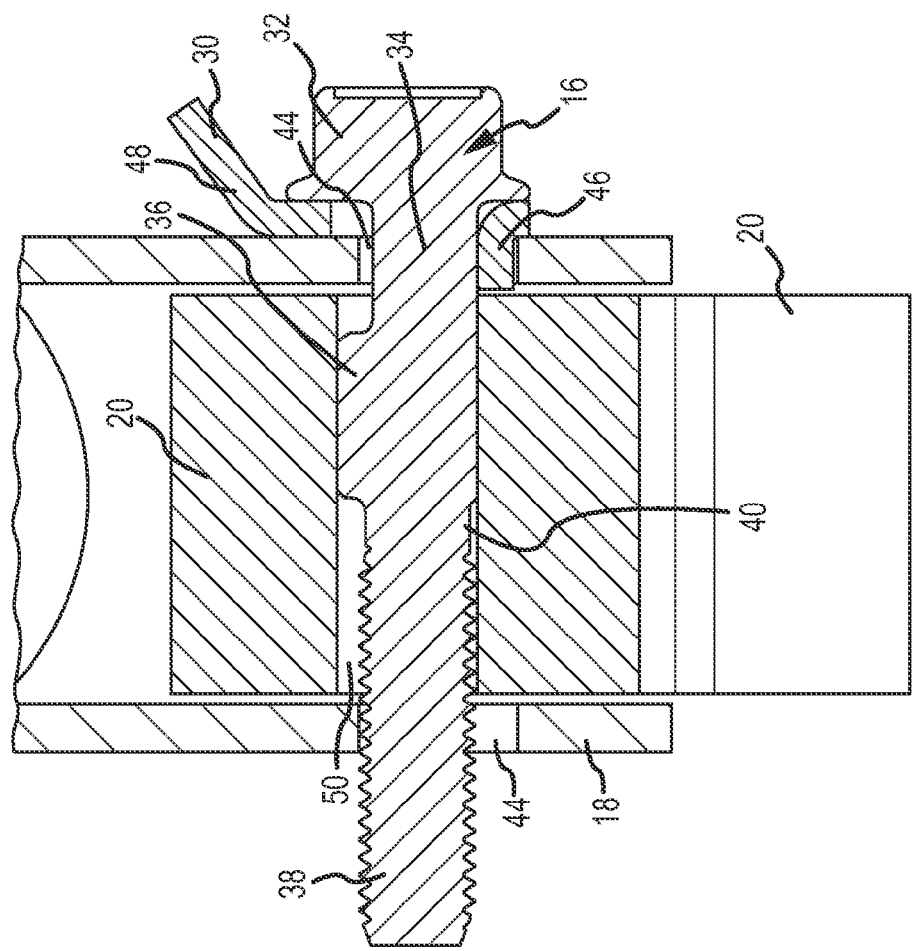
FIG. 10A is a cross-section view of the suspension strut connected to the knuckle via the adjustment assembly illustrated in FIG. 9, having a negative camber angle, viewed along line 10A-10A in FIG. 9.

FIG. 10A is a cross-section view of the suspension strut 12 connected to the knuckle 20 via the adjustment assembly 26 illustrated in FIG. 9 having a negative camber angle, viewed along line 10A-10A in FIG. 9. Referring to FIGS. 9 and 10A, when the lobe 36 is positioned within the adjustment aperture 50 so that the lobe 36 is facing backward towards the strut 12, the knuckle 20 may have a negative camber angle. This may be because the lobe 36 acts to push the knuckle 20 backward (away from a wheel) with respect to the U-bracket 18 and the strut 12. Thus, when a wheel is operably connected to the knuckle 20, a top portion of the wheel may be positioned toward the mid-plane of the vehicle.

Figure 10B:
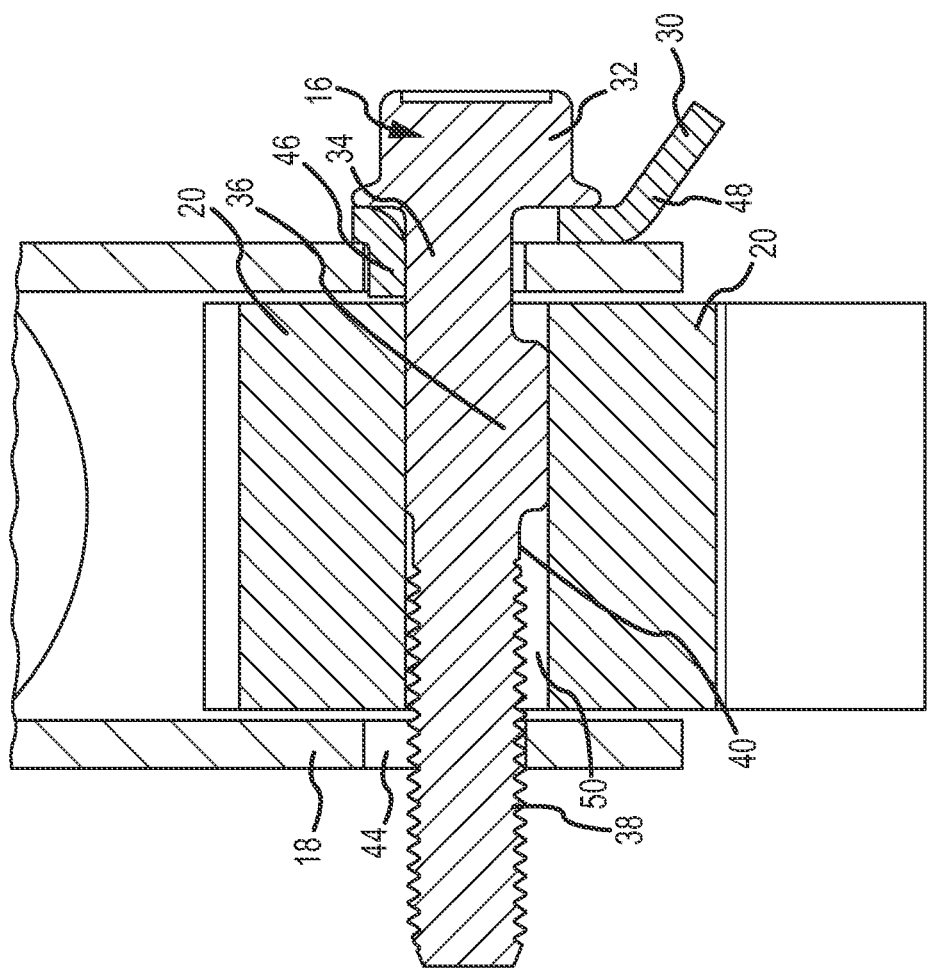
FIG. 10B is a cross-section view of the suspension strut connected to the knuckle via the adjustment assembly illustrated in FIG. 9, having a positive camber angle, viewed along line 10B-10B in FIG. 9.

FIG. 10B is a cross-section view of the suspension strut 12 connected to the knuckle 20 via the adjustment assembly 26 illustrated in FIG. 9 having a positive camber angle, viewed along line 10B-10B in FIG. 9. Referring now to FIGS. 9 and 10B, when the lobe 36 of the adjustment bolt 16 is positioned forward towards the knuckle 20, the knuckle 20 may have a positive camber angle. This may be because the lobe 36 acts to push the knuckle 20 forward (towards a wheel) with respect to the U-bracket 18 and the strut 12. Thus, when a wheel is operably connected to the knuckle 20, a top portion of the wheel may be positioned away from the mid-plane of the vehicle.

Figure 11:
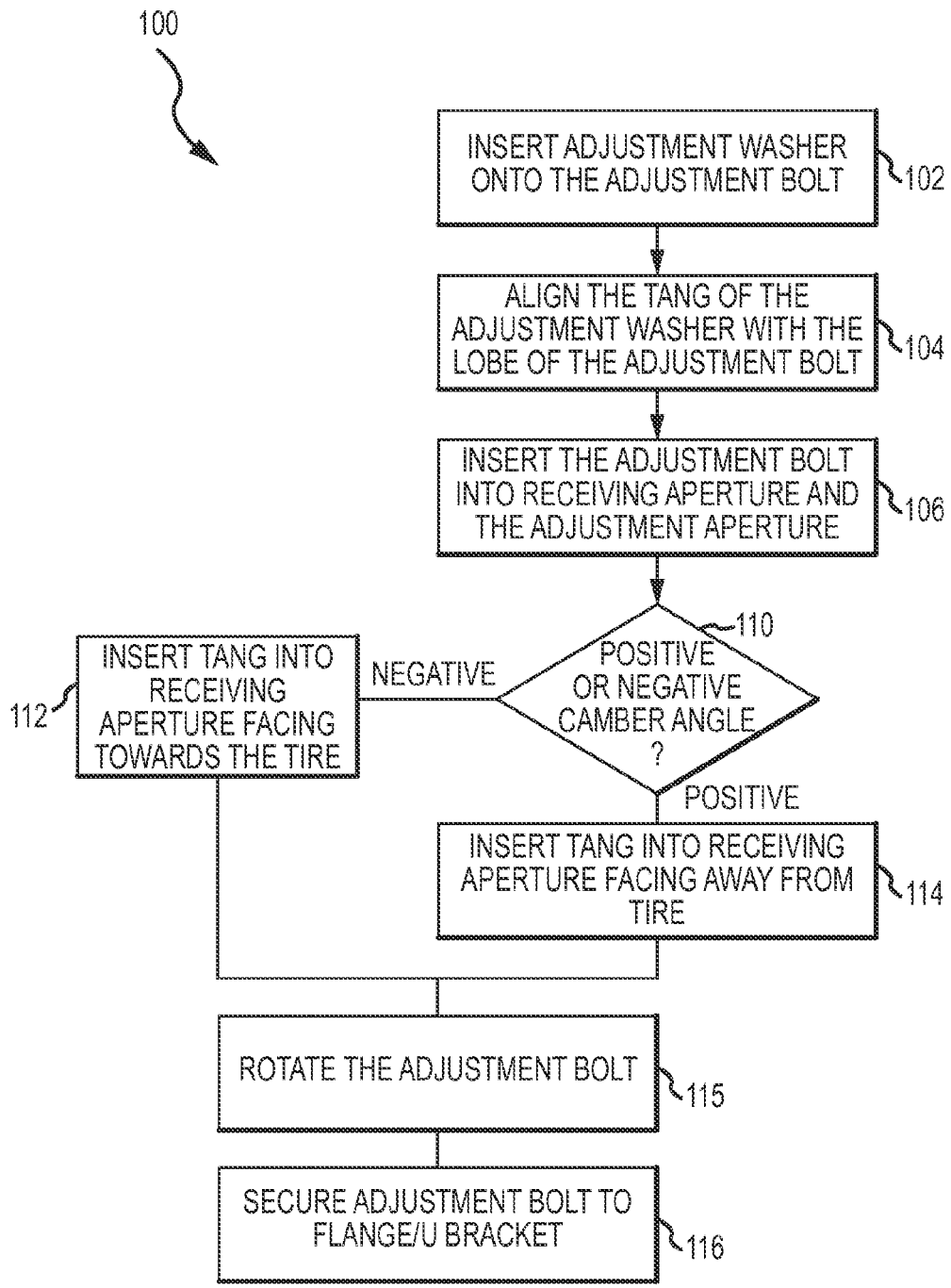
FIG. 11 is a flow chart illustrating a method for adjusting the camber angle on a vehicle using the adjustment assembly.

FIG. 11 is a flow diagram illustrating a method 100 for adjusting the camber angle of a vehicle. The method 100 begins with operation 102 and the adjustment washer 30 is inserted onto the adjustment bolt 16. For example, the adjustment washer 30 may be inserted around the threaded portion 38 and slid over the lobe 36 and around the neck 34. After operation 102, the method 100 proceeds to operation 104 and the tang 46 is aligned with the lobe 36 of the adjustment bolt 16. For example, the tang 46 should be positioned on the same side of the adjustment bolt 16 as the side of the lobe 36 that is not aligned with the neck 34 and major diameter of the threaded portion 38. In other words, the left side of the adjustment bolt 16, where the lobe 36 extends outwards past the threaded portion 38 and the neck 34. Once the tang 46 has been aligned with the lobe 36, the method 100 proceeds to operation 106. In this operation 106, the adjustment bolt 16 is inserted into the receiving aperture 44 and the adjustment aperture 50. The adjustment bolt 16 may be inserted so that the adjustment washer 30 is substantially flush with the U-bracket 18 or flange.

After the adjustment bolt 16 is inserted into the receiving aperture 44 and the adjustment aperture 50, the method 100 proceeds to operation 110. In this operation 110, the user determines whether the camber angle for the suspension system 10 needs to be adjusted in either the positive or negative direction. If the camber angle needs to be adjusted to a positive camber angle, the method 100 proceeds to operation 114. In operation 114, the tang 46 is inserted into the receiving aperture 44, such that it faces away from the tire or wheel of the vehicle. If, on the other hand, the camber angle needs to be adjusted to a negative camber angle, the method 100 proceeds to operation 112. In operation 112, the tang 46 is inserted into the receiving aperture 44 such that it faces towards the wheel or tire. It should be noted that if the adjustment bolt 16 is used in a lower receiving aperture on the U-bracket 18 (e.g., the receiving aperture for fastener 28 illustrated in FIG. 9), operations 112 and 114 may be reversed for achieving a positive or negative adjustment. In other words, if the adjustment bolt 16 is used in a lower receiving aperture, for positive adjustment the tang 46 may be inserted into the receiving aperture so that it faces towards the tire and for negative adjustment the tang 46 may be inserted into a lower receiving aperture so that it faces away from the tire. After operations 112, 114, the method 100 proceeds to operation 115 and the adjustment bolt 16 is rotated. As the adjustment bolt 16 rotates, the lobe 36 may be adjusted "out of phase" with the tang 46, creating a change in camber.

After operation 115, the method 100 proceeds to operation 116 and the adjustment bolt 16 is secured to the strut 12 and U-bracket 18. This operation 116 may involve inserting the locking nut 32 onto the adjustment bolt 16 and then tightening the locking nut 32 onto the threaded portion 38. However, the adjustment bolt 16 may be tightened to the strut 12 and/or the U-bracket 18 in other appropriate manners.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

What is claimed is:

1. An adjustment bolt for adjusting the camber angle in a vehicle comprising
    a head configured to provide a gripping surface for a tightening tool, wherein the head has a first diameter and a first centerline;
    a neck extending eccentrically from a bottom surface of the head, wherein the neck has a second diameter and a second centerline;
    a lobe extending eccentrically outward from the neck, wherein the lobe has a third diameter and the first centerline, such that the head and lobe each have the first centerline; and
    a threaded portion extending eccentrically from outward from the lobe, wherein the threaded portion has a third centerline; and
    wherein the first centerline, the second centerline and the third centerline are different from one another.

2. The adjustment bolt of claim 1, wherein along one side of the adjustment bolt a portion of each of the neck, the lobe, and the threaded portion intersect along a single plane.

3. The adjustment bolt of claim 1, wherein a major diameter of the threaded portion is effectively flush with a first side of the lobe.

4. The adjustment bolt of claim 3, wherein a second side of the lobe extends past the threaded portion.

5. The adjustment bolt of claim 1, wherein
    the first centerline is at a distance approximately equal to a radius of the lobe from a side surface of the adjustment bolt;
    the second centerline is at a distance approximately equal to a radius of the neck from a side surface of the adjustment bolt; and
    the third centerline is at a distance approximately equal to a radius of the threaded portion from a side surface of the adjustment bolt.

6. The adjustment bolt of claim 1, wherein a material comprising the adjustment bolt is steel alloy.

7. An adjustment assembly for adjusting a camber angle of a wheel for an automobile comprising
    an adjustment washer comprising
        a prong extending away at a first angle from a body of the washer; and
        a tang extending perpendicularly from the body of the washer, wherein the tang is configured to be inserted into a receiving aperture on a flange of a vehicle suspension system; and
    an adjustment bolt configured to be inserted into the adjustment washer, comprising
        a head;
        a neck extending eccentrically from a bottom surface of the head, wherein the neck is substantially cylindrically shaped and the neck has a neck centerline;
        a cam extending eccentrically from a right bottom surface of the neck opposite of the head, wherein the cam is substantially cylindrically shaped and has a cam centerline;
        a threaded portion extending eccentrically from a right bottom surface of the cam, such that along a right side surface of the adjustment bolt the neck, the cam and a major diameter of the threaded portion are effectively flush, and the threaded portion has a thread centerline; and
        wherein the neck centerline is different from the thread centerline.

8. The adjustment assembly of claim 7, further comprising a locking nut configured to be threaded onto the threaded portion.

9. The adjustment assembly of claim 7, wherein the adjustment bolt is steel alloy.

10. The adjustment assembly of claim 7, wherein the cam centerline is different from the neck centerline and the thread centerline.

11. The adjustment assembly of claim 10, wherein
the cam centerline has a first height measured from a right side of the adjustment bolt;
the neck centerline has a second height measured from a right side surface of the adjustment bolt;
the thread centerline has a third height measured from a right side surface of the adjustment bolt; and
wherein the first height is larger than the third height and the third height is larger than the second height.

12. The adjustment assembly of claim 7, wherein the head further comprises
a hexagonally shaped body; and
a plate extending outwards from a bottom surface of the hexagonally shaped body.

13. The adjustment assembly of claim 7, wherein the tang of the adjustment washer is configured to secure the adjustment bolt at a select position within a receiving aperture on the flange for a suspension system for a vehicle.

14. A method for adjusting a camber angle in a vehicle comprising
sliding an adjustment washer onto an adjustment bolt, wherein
the adjustment washer comprises
a prong extending away at a first angle from a body of the washer; and
a tang extending perpendicularly to the body of the washer, wherein the tang is configured to be inserted into a receiving aperture on a flange of a vehicle suspension system; and
the adjustment bolt comprises
a head;
a neck extending eccentrically from a bottom surface of the head, wherein the neck is substantially cylindrically shaped and the neck has a neck centerline;
a lobe extending eccentrically from a right bottom surface of the neck opposite of the head, wherein the lobe is substantially cylindrically shaped and has a lobe centerline; and
a threaded portion extending eccentrically from a right bottom surface of the lobe, such that along a right side surface of the adjustment bolt the neck, the lobe and a major diameter of the threaded portion are effectively flush, wherein the threaded portion has a thread centerline, and wherein the neck centerline, the lobe centerline, and the thread centerline are different from one another;
aligning the tang of the adjustment washer with the lobe of the adjustment bolt;
inserting the threaded portion of the adjustment bolt into a receiving aperture on a flange operably connected to a strut of the vehicle;
inserting the tang of the adjustment washer into the receiving aperture such that a bottom surface of the adjustment washer is substantially flush with a first outer surface of the flange; and
rotating the adjustment bolt within the receiving aperture to obtain a desired camber angle.

15. The method of claim 14, further comprising inserting the tang of the adjustment washer into the receiving aperture such that the tang is oriented towards a tire of the vehicle to achieve a negative camber angle.

16. The method of claim 15, further comprising
inserting a lock nut onto the threaded portion of the adjustment bolt behind the washer; and
threading the lock nut onto the threaded portion such that the locking nut is substantially flush with a second outer surface of the flange.

17. The method of claim 14, further comprising inserting the tang of the adjustment washer into the receiving aperture such that the tang is oriented away from a tire of the vehicle to achieve a positive camber angle.

* * * * *